(12) United States Patent
Kanai et al.

(10) Patent No.: US 6,451,866 B1
(45) Date of Patent: Sep. 17, 2002

(54) SPONGY RUBBER BODY

(75) Inventors: Takashi Kanai; Yasuyuki Sakyo, both of Saitama-ken (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 3 days.

(21) Appl. No.: 09/629,427

(22) Filed: Jul. 31, 2000

(30) Foreign Application Priority Data

Aug. 26, 1999 (JP) .......................................... 11-239575

(51) Int. Cl.$^7$ .................................................. C08J 9/02
(52) U.S. Cl. ............................ 521/82; 521/86; 521/91; 521/99; 521/110; 521/122; 521/134; 521/142; 521/154
(58) Field of Search ........................... 521/91, 154, 82, 521/86, 99, 110, 122, 134, 142

(56) References Cited

U.S. PATENT DOCUMENTS

| | | | | |
|---|---|---|---|---|
| 3,615,972 A | * | 10/1971 | Morehouse, Jr. et al. | ... 521/145 |
| 5,482,978 A | * | 1/1996 | Takahashi et al. | .......... 252/511 |
| 5,645,942 A | * | 7/1997 | Sutoh | ........................ 264/46.5 |
| 6,084,002 A | * | 7/2000 | Nicholson et al. | .......... 521/154 |

* cited by examiner

Primary Examiner—John M. Cooney, Jr.
(74) Attorney, Agent, or Firm—Wenderoth, Lind & Ponack, LLP

(57) ABSTRACT

Disclosed is a spongy rubber body or, in particular, spongy silicone rubber body useful for forming the semiconductive rubber layer of a rubber roller in photocopying machines and the like as well as for use as a spongy rubber puff in cosmetic makeup. Characteristically, the inventive spongy rubber is compounded with, besides ordinary ingredients in spongy silicone rubbers, a specified amount of globular particles of, preferably, a silicone rubber having a specified average particle diameter. Compounding of globular particles in a spongy rubber has an effect to give a uniformized and decreased average cell diameter of the spongy rubber and also to greatly decrease the permanent compression set of the spongy rubber as required in the rubber layer of a spongy rubber roller. Cosmetic puffs can be imparted with improved touch feeling to the human skin and improved evenness in spreading of a cosmetic composition over the skin.

7 Claims, No Drawings

SPONGY RUBBER BODY

BACKGROUND OF THE INVENTION

The present invention relates to a cured rubber body having a cellular structure and useful in a variety of applications not only in various general-purpose applications requiring a so-called spongy rubber such as puffs for spreading cosmetic compositions over the human skin but also in office-automation machines equipped with a spongy rubber roller such as laser beam printers and photocopying machines including development rollers, electrostatic charging rollers, toner-carrying rollers, toner-transfer rollers, cleaning rollers for photosensitive drums, referred to simply as cleaning rollers hereinafter, and the like. The spongy rubber of the invention is particularly suitable as a material for forming the rubber layer of a cleaning roller.

Following is a description of the background situations leading to the use of a spongy rubber roller in office-automation machines. In a laser beam printer or a photo-copying machine, namely, it is always the case in toner transfer in the image-forming unit that not all of the toner particles are transferred onto the paper sheet but a substantial amount of the toner particles are left untransferred on the photosensitive drum necessitating provision of a recovery system for the remaining toner particles. If the toner-recovery system works incompletely, the printed matter obtained by a succeeding printing run is necessarily contaminated with the toner particles remaining on the photosensitive drum in the preceding run leading to blur of the printed images not to give a printed matter of high quality.

In view of this problem, it is conventional that a spongy rubber is employed for the rubber layer of a rubber roller such as cleaning rollers, development rollers, toner-transfer rollers and the like working smoothly for removal of the remaining toner particles deposited on the photosensitive drum, for development with fresh toner particles onto the photosensitive drum and transfer of the toner particles onto a paper sheet. The spongy rubber roller here implied is an integral elongated body consisting of a shaft of an electro-conductive material including metals and alloys such as iron, aluminum, copper, stainless steels, zinc and brass or a shaft having a plating layer of these metals or alloys on the surface of an insulating rod and a layer of a spongy rubber coaxially formed on and around the shaft.

It is sometimes the case that, in these spongy rubber rollers, the rubber layer is required to have semiconductivity which is imparted to the rubber by compounding a rubber compound or, in particular, silicone rubber compound with a substantial amount of a conductivity-imparting agent such as carbon blacks. Since carbon blacks in general have an activity to inhibit curing of a silicone rubber curable with an organic peroxide as a curing agent, it is desirable that the silicone rubber compound is of the type which is free from the inhibitive effect of carbon blacks on curing such as those curable by the crosslinking mechanism involving the hydrosilation addition reaction. The most conventional blowing agent for forming the foamed cellular structure of the spongy rubber is azobisisobutyronitrile (AIBN). A spongy rubber body is obtained by heating the silicone rubber composition compounded with the curing agent and blowing agent in a hot-air oven, infrared oven, high-frequency induction heating oven and the like to effect simultaneous curing and foaming of the rubber composition under normal pressure.

As a major current in recent years, many of the office-automation machines are designed for the use of a toner having a decreased average particle diameter such as so-called polymerization toners. As a result of this shift toward finer toner particles, a new problem has arisen in conventional cleaning rollers currently under use that the average cell diameter of the spongy rubber layer of the roller, which is 20 $\mu$m or larger, is too large to comply with the decrease in the toner particle diameter so that cleaning of the photosensitive drum cannot be complete leaving some toner particles thereon unremoved adversely affecting the quality of the next printed matter. The "cell" of a spongy rubber here implied is the pore of the spongy rubber appearing on the surface and the average cell diameter, referred to simply as the cell diameter hereinafter, is calculated for 10 cells taken at random determining the cell diameter as the diameter of the largest circumcircle to the cell contour. Similarly, another problem is encountered in transfer rollers that the electric field on the spongy rubber layer is dependent on the cell diameter so that, when the cell diameter is too large, the image of the cells is transferred to the printed pattern.

With regard to development rollers, furthermore, the rubber layer on and around the metal shaft in a conventional development roller is formed not from a spongy rubber but from a solid, i.e. non-spongy, rubber in view of the duty of the development roller to put the toner particles uniformly onto the photosensitive drum. In order to comply with the demand for higher quality of printing and increase in the printing velocity, it is a requirement that the rubber layer of development rollers is formed from a rubber having a decreased rubber hardness. If the matter concerned is the rubber hardness alone, the problem can easily be solved by using a solid rubber of an inherently low rubber hardness but another problem must be solved in a development roller made from a low-hardness solid rubber that low-hardness rubbers in general exhibit a large permanent compression set resulting in a decrease in the durability of the rubber roller adversely affecting the printing quality in the long run.

Although it is possible even in the prior art method that a low-hardness spongy rubber having a cell diameter of about 150 $\mu$m can be prepared by adequately controlling the curing velocity and foaming velocity, it is a difficult matter to obtain a low-hardness spongy rubber having a rubber hardness not exceeding 40° Hs required for standard products of development rollers if not to mention that such a modification of the process conditions involves a serious disadvantage of a decrease in the productivity.

As regard to the application of spongy rubbers in the general industrial field, on the other hand, or, in particular, in relation to spongy rubber puffs used in cosmetic makeup for spreading a cosmetic composition over the skin, greatly diversified spongy rubbers are employed as the material of cosmetic puffs depending on the formulation and properties of the cosmetic compositions and preference of the respective users while a common problem must be solved in the spongy rubber materials for puffs in general. When the cell diameter of the spongy rubber puffs for spreading of a powdery foundation is too large, for example, a large bit of the foundation particles is held in a single pore of the spongy puff which cannot be spread over the skin with full smoothness and uniformity unless the foundation is spread to form a layer of a large thickness disregarding the unhealthy influences on the skin. Needless to say, a spongy cosmetic puff having cells of too coarse cell diameters is not preferred by consumers in respect of unpleasant touch feeling to the skin.

From the standpoint of giving a solution to the above described problems, spongy rubbers are required to have a cell diameter not exceeding 200 μm or, preferably, not exceeding 100 μm and a rubber hardness in the range from 10 to 40° Hs. In particular, the spongy rubber forming the rubber layer of development rollers is required to have a cell diameter not exceeding 50 μm.

SUMMARY OF THE INVENTION

The present invention accordingly has an object to provide a novel and improved spongy rubber having a cellular structure and free from the above described problems and disadvantages encountered in the prior art when the spongy rubber is used as a material of spongy rubber puffs for cosmetic makeup or as a material of spongy rubber rollers used in photocopying machines and the like.

Thus, the spongy rubber body provided by the present invention is a body having a cellular structure consisting of a blend of 100 parts by weight of a rubber composition, which is preferably a silicone rubber composition, and from 5 to 200 parts by weight of globular, preferably, hollow particles having an average particle diameter in the range from 0.1 to 100 μm.

In particular, the spongy rubber body has a rubber hardness in the range from 10 to 40° Hs according to the Ascar C scale and the cellular structure has an average cell diameter in the range from 10 to 200 μm.

DETAILED DESCRIPTION OF THE PREFERRED EMBODIMENTS

In the following, a detailed description is given on the spongy rubber body of the invention but the following description is given mainly for spongy silicone rubbers as a material of the rubber layer of spongy rubber rollers which is imparted with semiconductivity by compounding the rubber composition with a conductivity-imparting agent such as a conductive carbon black. The same description, however, is applicable also to the spongy rubber suitable as a material of spongy rubber puffs for cosmetic makeup when the description relative to the conductivity-imparting agent is disregarded.

As is described above, the spongy rubber body of the invention is formed from a blend of a rubber composition and a specified amount of globular particles having a specified average particle diameter. A great variety of rubber compounds can be used in the above mentioned rubber composition as the base material of the inventive spongy rubber body including NBRs, EPDM rubbers, urethane rubbers, silicone rubbers and the like, of which silicone rubbers are preferable, especially, as a material of spongy rubber cleaning rollers of which controllability of the cell diameter and electrostatic chargeability is essential each in a specified range. Silicone rubber compounds of a preferred type include those comprising a gum-like organopolysiloxane having silicon-bonded vinyl groups compounded with a curing agent which is a combination of an organohydrogenpolysiloxane and a platinum compound as a catalyst, reaction moderator, curing aid, reinforcing filler and other additives as well as a blowing agent.

As is known, the basic ingredients in a silicone rubber compound are an organopolysiloxane gum such as dimethylpolysiloxane gum, methylphenylpolysiloxane gum, methylvinylpolysiloxane gum and the like, a reinforcing silica filler such as fumed silica fillers, precipitated silica gillers and the like and a curing agent. When the organopolysiloxane gum is a methylvinylpolysiloxane gum having at least two silicon-bonded vinyl groups in a molecule, the curing agent is, as is mentioned above, a combination of an organohydrogenpolysiloxane and a catalytic amount of a platinum compound. Admixture of a curing aid such as an organic peroxide has an effect to improve the mechanical strengths and permanent compression set of cured silicone rubber products. Examples of suitable organic peroxides include benzoyl peroxide, bis(2,4-dichlorobenzoyl) peroxide, dicumyl peroxide, di-tert-butyl peroxide, 2,5-dimethyl-2,5-bis(tert-butylperoxy) hexane and the like.

It is optional that a silicone rubber compound is compounded with a non-reinforcing silica filler with an object to further improve heat resistance of the silicone rubber or to modify the rubber hardness of the cured silicone rubber. When a semiconductive spongy rubber roller is desired, the silicone rubber composition of the above described formulation is further admixed with a conductivity-imparting agent such as a carbon black. The cellular structure of the spongy rubber can be obtained by compounding the rubber composition with a blowing agent which is selected from inorganic blowing agents such as sodium hydrogencarbonate and organic blowing agents such as ADCA, AIBN and 1,1'-azobis(1-acetoxy-1-phenyl) ethane as preferable examples in respect of easiness in obtaining a good balance between curing and expansion of the rubber composition proceeding concurrently in molding of the spongy rubber body at a temperature of 100 to 200° C. depending on the decomposition temperature of the blowing agent. The amount of the blowing agent contained in the silicone rubber composition is in the range from 0.5 to 20 parts by weight per 100 parts by weight of the silicone rubber compound. When the amount of the blowing agent is too small, satisfactory expansion of the rubber composition to form the cellular structure cannot be accomplished as a matter of course while, when the amount thereof is too large, the porosity of the foamed silicone rubber would be excessively large so that the spongy rubber body of the so coarse texture is no longer suitable for most applications due to a great decrease in the mechanical strengths.

Examples of the reaction moderator mentioned above include methyl vinyl cyclotetrasiloxanes, acetylene alcohols, siloxane-modified acetylene alcohols, organic hydroperoxides and the like. Organic peroxides serve as a curing aid and non-reinforcing silica fillers serve as an additive for modifying the rubber hardness and improving the heat resistance of the cured and foamed silicone rubber. The platinum compound as a part of the curing agent as combined with an organohydrogenpolysiloxane can be selected from chloroplatinic acid, alcohol-modified chloroplatinic acid and complexes of chloroplatinic acid with an olefin, e.g., ethylene, vinylsiloxane, and the like as well as finely divided elementary platinum supported on a solid carrier material such as silica, alumina, carbon and the like. Various kinds of inorganic fillers can also be used as a non-reinforcing filler in a limited amount with an object of controlling the electrostatic chargeability.

The silicone rubber composition from which the spongy silicone rubber body of the invention is obtained by curing and expansion is prepared by compounding the above described silicone rubber compound with a specified amount of globular particles which serve as an aid for promoting uniform dispersion of the blowing agent in the silicone rubber composition for spongy rubber rollers and spongy rubber puffs so as to ensure uniformity of the cellular structure formed by the thermal decomposition of the blowing agent as well as uniform dispersion of the carbon black particles added to a silicone rubber composition for spongy silicone rubber rollers so as to prevent local non-uniformity in the volume resistivity of the semiconductive spongy silicone rubber layer.

The globular particle implied in the present invention is a particle having a smooth and continuous convexed surface without any acutely angled points and ridges so that the configuration of the globular particle is not limited to a true sphere. Examples of globular particles include so-called spherical silica particles, spherical silicone rubber particles and spherical carbon particles, which may be hollow or non-hollow, though not particularly limitative thereto. The above mentioned non-angular configuration of the globular particles such as spheres and ellipsoids is important when the spongy rubber roller is a cleaning roller or a development roller of a photocopying machine coming into contact with the photosensitive drum. Angled configuration of the globular particles such as quadrangular and triangular pyramids is undesirable because of possible troubles due to occurrence of scratches on the surface of the photosensitive drum by contacting with the spongy silicone rubber roller containing angled particles. In other words, globular particles having a particle configuration of a pyramid can be used if the angled ridhes and points are adequately chamfered or dulled. In this regard, use of globular particles having a hollow structure is advantageous because of a decrease in the occurrence of scratches on the surface of the photosensitive drum by contacting with the spongy rubber roller or the rough touch feeling of the spongy rubber puffs coming into direct contact with the skin of the face.

The amount of the globular particles in the silicone rubber composition for the formation of a spongy rubber roller or spongy rubber puff is in the range from 5 to 200 parts by weight per 100 parts by weight of the silicone rubber compound. When the amount of the globular particles is too small, the advantageous effect to be obtained therewith would be insufficient as a matter of course while, when the amount of the globular particles is too large, difficulties are encountered in respect of the workability of the silicone rubber composition and the spongy rubber body formed therefrom would suffer a decrease in the general properties as a spongy rubber.

As to the particle size distribution of the globular particles, it is desirable that the average particle diameter of the particles is in the range from 0.1 to 100 $\mu$m or, preferably, from 0.1 to 50 $\mu$m. When the average particle diameter thereof is too small, agglomeration of the particles is sometimes unavoidable while, when the average particle diameter is too large, some of the globular particles eventually fall off the cell walls of the spongy rubber body resulting in a decrease in the general properties of the spongy rubber.

In the following, the spongy rubber body of the invention is described in more detail by way of working examples which, however, never limit the scope of the invention in any way.

EXAMPLE 1

A curable and foamable semiconductive silicone rubber composition was prepared by uniformly blending 100 parts by weight of an electroconductive silicone rubber compound (TCM 5406U, a product by Toshiba Silicone Corp.) with 20 parts by weight of hollow spherical silicone rubber particles having an average particle diameter of 5 $\mu$m, 2 parts by weight of an organohydrogenpolysiloxane, 15 parts by weight of 1,1-azobis(1-acetoxy-1-phenyl) ethane as a blowing agent and a catalytic amount of chloroplatinic acid.

Separately, a metal rod as a roller shaft having a diameter of 6 mm and a length of 250 mm provided with a plating layer of nickel by the method of electroless plating was degreased by washing with toluene and then subjected to a primer treatment by coating with a primer solution followed by baking in a Geer oven at 180° C. for 30 minutes and spontaneous cooling to room temperature taking 30 minutes or more.

The silicone rubber composition was extrusion-molded on and around the thus primer-treated metal shaft to form a coaxial layer of the silicone rubber composition which was subjected to a heat treatment in two steps first in an infrared oven at 200° C. for 10 minutes to effect primary curing and then in a Geer oven at 225° C. for 7 hours to effect secondary curing followed by standing at room temperature for 1 hour and then grinding of the surface on a cylindrical grinder to give an outer diameter of the spongy rubber layer of 12 mm.

The semiconductive spongy silicone rubber roller prepared in this manner was subjected to the evaluation tests for the items including; average cell diameter on the surface of the spongy silicone rubber layer; bulk density of the spongy rubber layer; rubber hardness of the spongy rubber layer; permanent compression set of the rubber layer; and roller resistance and the variation range thereof, i.e. the ratio of the largest value and smallest value of the roller resistance. The results of the evaluation tests are shown in Table 1 below.

The testing procedures for the respective test items are given below.

(1) Average cell diameter, $\mu$m: A 100 magnification photograph of the roller surface was taken with an optical microscope and the diameters of 10 cells taken at random were measured and averaged.

(2) Bulk density, g/cm$^3$: Measurement was made by using a specific gravity tester (Model ED-120T, manufactured by MFD BY A & D Co.).

(3) Rubber hardness, ° Hs: Measurements were made according to the Ascar C scale.

(4) Permanent compression set, mm: The spongy rubber roller was mounted on a horizontal bed and pressed against the bed by hanging a 500 g weight on each of the end portions of the metal shaft extending out of the rubber layer to be kept as such for 2 weeks in an atmosphere of 90% relative humidity at 40° C. The rubber roller taken up by removing the weights was kept standing for 24 hours at 20° C. and the thickness of the rubber layer was measured for the portion under compression for 2 weeks at 40° C. to record the decrease in the thickness of the spongy rubber layer due to prolonged compression.

(5) Roller resistance, ohm: The spongy rubber roller was mounted on a horizontal electrode plate and pressed against the electrode plate by hanging a 100 g weight on each of the end portions of the metal shaft extending out of the spongy rubber layer. The electric resistance between the metal shaft and the electrode plate was determined by four-point measurement using an ultra-high resistance meter (manufactured by Advantest Co.) after application of a DC voltage of 100 volts for 10 seconds and the averaged value was recorded as the roller resistance.

(6) Range of roller resistance: The ratio of the largest value and smallest value obtained in the roller resistance measurement was calculated and recorded.

EXAMPLE 2

The procedures for the preparation of a spongy silicone rubber roller and the evaluation tests thereof were substantially the same as in Example 1 except that the hollow spherical silicone rubber particles had an average particle diameter of 50 $\mu$m instead of 5 $\mu$m.

The results of the evaluation tests are shown in Table 1 below.

EXAMPLE 3

The procedures for the preparation of a spongy silicone rubber roller and the evaluation tests thereof were substantially the same as in Example 1 except that the hollow spherical silicone rubber particles had an average particle diameter of 0.2 μm instead of 5 μm.

The results of the evaluation tests are shown in Table 1 below.

EXAMPLE 4

The procedures for the preparation of a spongy silicone rubber roller and the evaluation tests thereof were substantially the same as in Example 1 except that the hollow spherical silicone rubber particles were replaced with the same amount of hollow spherical silica particles having an average particle diameter of 5 μm.

The results of the evaluation tests are shown in Table 1 below.

EXAMPLE 5

The procedures for the preparation of a spongy silicone rubber roller and the evaluation tests thereof were substantially the same as in Example 1 except that the hollow spherical silicone rubber particles were replaced with the same amount of solid, i.e. non-hollow, spherical silicone rubber particles having an average particle diameter of 5 μm.

The results of the evaluation tests are shown in Table 1 below.

EXAMPLE 6

The procedures for the preparation of a spongy silicone rubber roller and the evaluation tests thereof were substantially the same as in Example 1 except that the hollow spherical silicone rubber particles were replaced with the same amount of solid, i.e. non-hollow, spherical silica particles having an average particle diameter of 5 μm.

The results of the evaluation tests are shown in Table 1 below.

EXAMPLE 7

The procedures for the preparation of a spongy silicone rubber roller and the evaluation tests thereof were substantially the same as in Example 1 except that the hollow spherical silicone rubber particles were replaced with the same amount of solid, i.e. non-hollow, spherical carbon black particles having an average particle diameter of 5 μm.

The results of the evaluation tests are shown in Table 1 below.

EXAMPLE 8

The procedures for the preparation of a spongy silicone rubber roller and the evaluation tests thereof were substantially the same as in Example 1 except that the electrically conductive silicone rubber compound (TCM 5406U) was replaced with the same amount of an electrically insulating silicone rubber compound (TSU 2575U, a product by Toshiba Silicone Corp.).

The results of the evaluation tests excepting for the roller resistance are shown in Table 1 below.

Comparative Example 1

The procedures for the preparation of a spongy silicone rubber roller and the evaluation tests thereof were substantially the same as in Example 1 except that the hollow spherical silicone rubber particles had an average particle diameter of 150 μm instead of 5 μm.

The results of the evaluation tests are shown in Table 1 below.

Comparative Example 2

The procedures for the preparation of a spongy silicone rubber roller and the evaluation tests thereof were substantially the same as in Comparative Example 1 except that the hollow spherical silicone rubber particles having an average particle diameter of 150 μm were replaced with the same amount of solid, i.e. non-hollow, spherical silicone rubber particles having an average particle diameter of 150 μm.

The results of the evaluation tests are shown in Table 1 below.

Comparative Examples 3 and 4

A foamable silicone rubber composition was prepared in each of these Comparative Examples by compounding in the same formulation as in Example 1 excepting the use of the same amount of hollow or solid, respectively, spherical silicone rubber particles which had an average particle diameter of 0.05 μm instead of 5 μm.

The attempt of extrusion molding with each of the thus prepared silicone rubber compositions failed to give a silicone rubber layer on and around the metal shaft.

TABLE 1

|  | Average cell diameter, μm | Bulk density, g/cm³ | Rubber hardness, °Hs | Permanent compression set, mm | Roller resistance, × 10⁵ ohm | Range of roller resistance |
|---|---|---|---|---|---|---|
| Example 1 | 75 | 0.40 | 28 | 0.025 | 2.12 | 1.31 |
| Example 2 | 125 | 0.36 | 25 | 0.040 | 3.19 | 1.29 |
| Example 3 | 40 | 0.55 | 32 | 0.021 | 1.31 | 1.56 |
| Example 4 | 80 | 0.42 | 28 | 0.026 | 2.02 | 1.38 |
| Example 5 | 85 | 0.51 | 30 | 0.018 | 1.81 | 1.21 |
| Example 6 | 85 | 0.53 | 31 | 0.020 | 1.74 | 1.42 |
| Example 7 | 75 | 0.39 | 28 | 0.038 | 3.74 | 1.11 |
| Example 8 | 80 | 0.37 | 30 | 0.009 | — | — |

TABLE 1-continued

|  | Average cell diameter, μm | Bulk density, g/cm³ | Rubber hardness, °Hs | Permanent compression set, mm | Roller resistance, × 10⁵ ohm | Range of roller resistance |
|---|---|---|---|---|---|---|
| Comparative Example 1 | 220 | 0.18 | 15 | 0.079 | 6.14 | 1.39 |
| Comparative Example 2 | 230 | 0.18 | 15 | 0.072 | 6.06 | 1.40 |

EXAMPLE 9

A foamable silicone rubber composition was prepared in the same formulation as in Example 1 excepting for the replacement of the electrically conductive silicone rubber compound with the same amount of an electrically insulating silicone rubber compound (TSE 2575U, a product by Toshiba Silicone Corp.).

The silicone rubber composition was extrusion-molded into a slab having a width of 50 mm, length of 150 mm and thickness of 15 mm, which was subjected to a heat treatment in two steps for curing and expansion first at 200° C. for 10 minutes in an infrared oven and then at 225° C. for 7 hours in a Geer oven followed by standing for 1 hour at room temperature. The thus obtained block of foamed silicone rubber was sliced with a slicing machine in a thickness of 10 mm to expose the cellular structure of the spongy rubber. The 10 mm thick foamed silicone rubber slab was cut in a 45 mm by 70 mm rectangular form which was then chamfered along the ridges to give a spongy rubber puff for cosmetic makeup.

The spongy rubber puff prepared in this manner was subjected to the evaluation tests for the average cell diameter, bulk density and rubber hardness in the same manner as in the preceding examples and for the touch feeling to the skin and unevenness in spreading of a powdery foundation over the skin to give the results shown in Table 2 below. The results of the evaluation tests for touch feeling and foundation spreading were recorded in four ratings of A (excellent), B (good), C (fair) and D (poor).

EXAMPLE 10

The procedures for the preparation of a spongy rubber puff and the evaluation tests thereof were substantially the same as in Example 9 except that the hollow spherical silicone rubber particles had an average particle diameter of 50 μm instead of 5 μm.

The results of the evaluation tests are shown in Table 2 below.

EXAMPLE 11

The procedures for the preparation of a spongy rubber puff and evaluation tests thereof were substantially the same as in Example 9 except that the hollow spherical silicone rubber particles had an average particle diameter of 0.2 μm instead of 5 μm.

The results of the evaluation tests are shown in Table 2 below.

EXAMPLE 12

The procedures for the preparation of the spongy rubber puff and evaluation tests thereof were substantially the same as in Example 9 except that the hollow spherical silicone rubber particles were replaced with the same amount of hollow spherical silica particles having an average particle diameter of 5 μm.

The results of the evaluation tests are shown in Table 2 below.

EXAMPLE 13

The procedures for the preparation of a spongy rubber puff and evaluation tests thereof were substantially the same as in Example 9 except that the hollow spherical silicone rubber particles were replaced with the same amount of solid, i.e. non-hollow, spherical silicone rubber particles having an average particle diameter of 5 μm.

The results of the evaluation tests are shown in Table 2 below.

EXAMPLE 14

The procedures for the preparation of a spongy rubber puff and evaluation tests thereof were substantially the same as in Example 9 except that the hollow spherical silicone rubber particles were replaced with the same amount of solid, i.e. non-hollow, spherical silica particles having an average particle diameter of 5 μm.

The results of the evaluation tests are shown in Table 2 below.

Comparative Example 5

The procedures for the preparation of a spongy rubber puff and evaluation tests thereof were substantially the same as in Example 9 except that the hollow spherical silicone rubber particles had an average particle diameter of 0.05 μm instead of 5 μm.

The results of the evaluation tests are shown in Table 2 below.

Comparative Example 6

The procedures for the preparation of a spongy rubber puff and evaluation tests thereof were substantially the same as in Example 9 except that the hollow spherical silicone rubber particles had an average particle diameter of 150 μm instead of 5 μm.

The results of the evaluation tests are shown in Table 2 below.

Comparative Example 7

The procedures for the preparation of a spongy rubber puff and evaluation tests thereof were substantially the same as in Example 9 except that the hollow spherical silicone rubber particles were replaced with the same amount of solid, i.e. non-hollow, spherical silicone rubber particles having an average particle diameter of 0.05 μm.

The results of the evaluation tests are shown in Table 2 below.

Comparative Example 8

The procedures for the preparation of a spongy rubber puff and evaluation tests thereof were substantially the same as in Example 9 except that the hollow spherical silicone rubber particles were replaced with the same amount of solid, i.e. non-hollow, spherical silica particles having an average particle diameter of 150 μm.

The results of the evaluation tests are shown in Table 2 below.

TABLE 2

| | Average cell diameter, μm | Bulk density, g/cm$^3$ | Rubber hardness, °Hs | Touch feeling | Foundation spreading |
|---|---|---|---|---|---|
| Example 9 | 65 | 0.25 | 15 | A | A |
| Example 10 | 105 | 0.19 | 10 | A | B |
| Example 11 | 45 | 0.36 | 22 | B | A |
| Example 12 | 70 | 0.28 | 17 | A | A |
| Example 13 | 60 | 0.48 | 25 | B | A |
| Example 14 | 75 | 0.39 | 28 | B | A |
| Comparative Example 5 | 20 | 0.65 | 42 | C | C |
| Comparative Example 6 | 250 | 0.18 | 10 | B | D |
| Comparative Example 7 | 25 | 0.72 | 45 | D | D |
| Comparative Example 8 | 230 | 0.21 | 12 | B | D |

What is claimed is:

1. A spongy rubber body having a cellular structure formed from a rubber a blend comprising 100 parts by weight of a rubber compound and from 5 to 200 parts by weight of globular particles having an average particle diameter in the range from 0.1 to 100 μm.

2. The spongy rubber body as claimed in claim 1 in which the globular particles are hollow particles.

3. The spongy rubber body as claimed in claim 1 in which the cellular structure has an average cell diameter in the range from 10 200 μm.

4. The spongy rubber body as claimed in claim 1 in which the rubber compound is a silicone rubber compound.

5. The spongy rubber body as claimed in claim 1 in which the globular particles are spherical silicone rubber particles.

6. The spongy rubber body as claimed in claim 1 which has a rubber hardness in the range from 10 to 40° Hs in the Ascar C scale.

7. The spongy rubber body as claimed in claim 1 in which the average particle diameter of the globular particles is in the range from 0.1 to 50 μm.

* * * * *